(12) United States Patent
Iranmanesh et al.

(10) Patent No.: US 11,552,839 B2
(45) Date of Patent: Jan. 10, 2023

(54) RESIDENTIAL GATEWAY WITH TRAFFIC SCHEDULING

(71) Applicant: AT&T Intellectual Property I, L.P., Atlanta, GA (US)

(72) Inventors: Reza Iranmanesh, Middletown, NJ (US); Abouzar Ghavami Pakdehi, Old Bridge, NJ (US); Kaveh Mirzaei, Old Bridge, NJ (US); Amzad Khan, Edison, NJ (US); Saeed Manii, Paramus, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 54 days.

(21) Appl. No.: 16/910,314

(22) Filed: Jun. 24, 2020

(65) Prior Publication Data
US 2021/0409261 A1 Dec. 30, 2021

(51) Int. Cl.
| H04L 41/0654 | (2022.01) |
| H04W 24/04 | (2009.01) |
| H04L 41/16 | (2022.01) |
| H04L 12/66 | (2006.01) |
| H04W 88/16 | (2009.01) |
| H04W 76/10 | (2018.01) |

(52) U.S. Cl.
CPC .......... *H04L 41/0654* (2013.01); *H04L 41/16* (2013.01); *H04W 24/04* (2013.01); *H04W 76/10* (2018.02); *H04L 12/66* (2013.01); *H04W 88/16* (2013.01)

(58) Field of Classification Search
CPC .... H04L 41/0654; H04L 45/22; H04L 45/247
See application file for complete search history.

(56) References Cited

U.S. PATENT DOCUMENTS

| 7,590,055 | B2 * | 9/2009 | Segel | H04L 45/22 |
| | | | | 370/228 |
| 9,300,581 | B1 * | 3/2016 | Hui | H04W 72/10 |
| 2016/0285676 | A1 * | 9/2016 | Kerpez | H04M 3/304 |
| 2017/0078956 | A1 * | 3/2017 | LeBlanc | H04W 48/18 |
| 2020/0026632 | A1 * | 1/2020 | Brinkmann | G06N 20/20 |
| 2020/0112489 | A1 * | 4/2020 | Scherger | G06F 11/3466 |
| 2020/0186626 | A1 * | 6/2020 | Martin | H04L 69/08 |

* cited by examiner

*Primary Examiner* — James P Duffy
(74) *Attorney, Agent, or Firm* — Guntin & Gust, PLC; Matthew Tropper

(57) ABSTRACT

The stability and reliability of broadband service connectivity improved by utilizing both wireline and wireless connections. For example, a residential gateway may continue to provide stable broadband connectivity to a service provider network (e.g., exceeding minimum quality of service thresholds) when subjected to a broadband fault (e.g., loss or degradation of data) by managing or utilizing both a wireline broadband connection and a wireless broadband connection.

20 Claims, 8 Drawing Sheets

200

```
┌─────────────────────────────────────────────┐
│ Manage, by a traffic schedule manager, access│
202 │ to a wireline broadband connection of a      │
│ residential gateway                          │
└─────────────────────────────────────────────┘
                     │
                     ▼
┌─────────────────────────────────────────────┐
│ Manage, by the traffic schedule manager,     │
204 │ access to a wireless broadband connection of │
│ the residential gateway                      │
└─────────────────────────────────────────────┘
                     │
                     ▼
┌─────────────────────────────────────────────┐
205 │ Obtain, by the traffic schedule manager, a   │
│ performance of the broadband connectivity    │
└─────────────────────────────────────────────┘
                     │
                     ▼
┌─────────────────────────────────────────────┐
│ Determine, by the traffic schedule manager   │
│ based on the performance, a priority between │
206 │ the wireline broadband connection and the    │
│ wireless broadband connection                │
└─────────────────────────────────────────────┘
                     │
                     ▼
┌─────────────────────────────────────────────┐
208 │ Provide the broadband connectivity based on  │
│ the determined priority                      │
└─────────────────────────────────────────────┘
```

FIG. 2A

RESIDENTIAL GATEWAY WITH TRAFFIC SCHEDULING

BACKGROUND

Offering broadband services that meet customer expectations in an efficient manner can be challenging. For example, failure of a broadband supplier to meet minimum quality of service (QoS) requirements for its customers is likely to result in poor customer satisfaction. Moreover, when a customer's broadband service fails to transfer data at the minimum QoS requirements, the customer often contacts care service to resolve the problem. If a care agent is unable to resolve the problem over the phone, the care agent often schedules a dispatch to resolve the problem at the customer residential area, lengthening service outage response time, further aggravating the customer, and resulting in significant cost for the broadband supplier.

SUMMARY

Disclosed herein are devices, systems, and methods for improving the capabilities for gateway systems to provide broadband service and connectivity. For example, a residential gateway may continue to provide stable broadband connectivity to a service provider network (e.g., exceeding minimum quality of service thresholds) when subjected to a broadband problem (e.g., loss or degradation of data).

In an example, a traffic schedule manager manages a wireline broadband connection of the residential gateway and a wireless broadband connection (e.g., a 5G or 4G-LTE broadband connection) of the residential gateway. For example, the traffic schedule manager may determine a priority between the wireline broadband connection and the wireless broadband connection, e.g., based on a preference for the wireline broadband unless there is a loss or degradation of wireline broadband connectivity or based on satisfying guaranteed minimum quality of service (QoS) requirements in a customer's service agreement.

In some examples, a broadband problem (e.g., a loss or degradation of data associated with the wireline broadband) is identified and the priority is based on the broadband problem. Moreover, an AI advisor monitoring center may be notified about the broadband problem and the AI advisor may diagnose the broadband problem or propose one or more solutions to the broadband problem. In some examples, a persistent broadband problem (e.g., a recurring loss or degradation of data associated with the wireline broadband) is identified and the AI may schedule a dispatch to solve the persistent broadband problem.

In accordance with some examples, a computer readable storage medium has stored therein instructions that are computer executable to perform or cause performance of any of the methods described herein. In accordance with some examples, a device includes one or more processors, a memory, and one or more programs; the one or more programs are stored in the memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 2A illustrates a flowchart of an example method of the present disclosure for providing stable broadband connectivity at a residential gateway;

Figure 1:
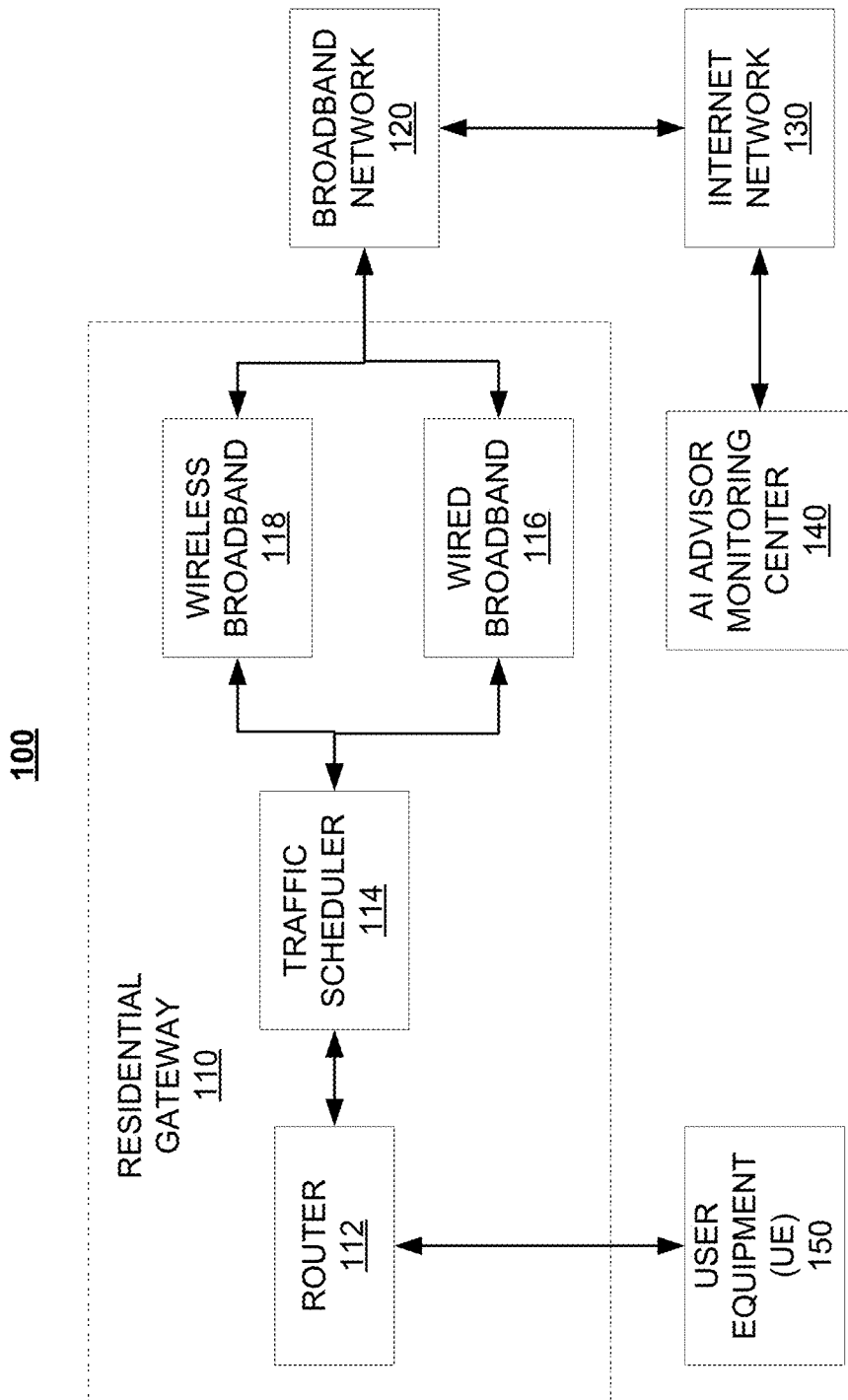
FIG. 1 illustrates a representation of an exemplary network.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

As internet speeds have increased, the internet has become an increasingly important utility for many people. For example, broadband internet has made it possible for many people to utilize the internet as a hub for communication, information, and entertainment. It follows that a loss of internet connectivity or degradation in internet speed can present a significant interruption in internet users' day-to-day activities.

Accordingly, internet service providers (ISPs) have developed quality of service (QoS) requirements, which may, for example, address performance metrics including required bit rates, latency, latency variation, packet loss or bit error rates, among others. Moreover, QoS is important for real-time streaming multimedia applications such as voice over IP (VoIP), multiplayer online games and Internet Protocol Television (IPTV), since these often require fixed bit rate and may be delay sensitive. QoS is especially important in networks where the capacity is a limited resource, for example in cellular data communication.

According to some examples, the present disclosure may allow ISPs to provide continuous guaranteed minimum QoS data traffic scheduling through a residential gateway maintained by an automatic monitoring system. By providing customers with their minimum QoS requirements, examples may increase customer satisfaction or reduce dispatch costs, ultimately increasing the revenue of the ISP.

In some examples, a residential gateway includes a wireline broadband connection and wireless network broadband connection (e.g., 5G or 4G-LTE), along with a traffic scheduler. For example, a traffic scheduler inside the residential gateway may distribute data through either the wireless broadband network or the wireline broadband network to provide a stable broadband connectivity that satisfies the guaranteed minimum QoS requirements in the customer's service agreement or reduces the chance of the customer requesting care and dispatch services. In some examples, the scheduler prioritizes scheduling traffic over the wireline broadband connection. For example, the wireline broadband connection may have much larger bandwidth capacity than the mobile wireless broadband connection.

In some examples, the residential gateway may notify a monitoring center. The monitoring center may include an artificial intelligence (AI) advisor which may, for example, be a server having machine learning algorithms programmed to run thereon. The monitoring center may also be staffed with customer service reps and/or technicians to trouble shoot or provide customer support services as needed. As such, if there are persistent issues with the wireline broadband which necessitates frequent use of the mobile broadband network. The AI advisor may diagnose the problem or apply remote solutions to solve the problem. Moreover, the AI advisor may propose solutions to a customer service agent to resolve the problem, which may, for example, involve resolving issues with the customer over the telephone. In some examples, a dispatch of a technician may be scheduled to solve the problem at the residence if the problem persists or if the customer is not satisfied with the QoS. In some examples, a specialized graphical user interface (GUI), displayed, for example, on a customer service agent device, facilitates access by a customer service agent to one or more testing capabilities of the residential gateway or the AI advisor. While the AI advisor and the customer service representatives are described as being co-located, it will be understood that is for illustrative purposes only and there is no requirement for such co-location.

In some examples, a broadband line problem may be detected by an automatic care system. For example, an automatic care system of the AI advisor may monitor performance, detect a problem with performance, and then diagnose the problem through ongoing development of machine learning techniques. Moreover, early analysis of the problem may provide the service provider with additional time to propose an optimal solution to resolve the problem, further increasing customer satisfaction and the reputation of the service provider. Moreover, automatic identification of the problem through an AI advisor automated failure identification system (e.g., without a customer service agent in the middle) may reduce the cost of customer service for the ISP. As a further example, temporary broadband wireline failures may be addressed by a technical support group of a service provider and the mobile broadband connection may assist in transferring data until the temporary wireline broadband problem is resolved.

In some examples, the residential gateway is capable of connecting to the broadband network without the wireline (e.g., cable) connection. For example, the residential gateway may be portable. In some examples, the broadband connection may be programmed to only transfer data to the base stations that are in the vicinity of the residential address of the customer or the residential gateway may allow customers to use it outside their residential address, which may, for example require service provider permission and perhaps a surcharge. Such a feature may increase the flexibility of residential gateway usage for the customer and increase the revenue of the ISP.

The present disclosure provides a practical application of a system and method which provides consistent QoS to broadband customers by providing, within a residential gateway, dual broadband networks and a traffic scheduler, to permit the use of one of the dual broadband networks. Coupled with an AI-based monitoring, diagnostic and repair system, the system and method provides a means for service providers a means for increased customer satisfaction and thereby increase revenue. Moreover, the present disclosure advances the state of the telecommunications technology by providing new functionality for switching, monitoring, and diagnostics of network and network interfaces.

FIG. 1 is a block diagram depicting one example of a communications network 100. The communications network 100 may be any type of communications network, which may, for example, be a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network, a long term evolution (LTE) network, and the like) related to the current disclosure. It should be noted that an IP network is broadly defined as a network that uses Internet Protocol to exchange data packets. Additional illustrative IP networks include VoIP networks, Service over IP (SoIP) networks, and the like. It should also be noted that the network 100 has been simplified. For example, the network 100 may include other network elements (not shown) such as border elements, routers, switches, policy servers, security devices, firewalls, a content distribution network (CDN) and the like.

In an example, the network 100 includes a residential gateway 110. Furthermore, in some examples, the residential gateway includes a router 112 in communication with a traffic scheduler 114. The router 112 may be adapted to receive data from the traffic scheduler 114 and to route the data to one or more forms of user equipment (UE) (e.g., UE 150). For example, the router 112 may receive voice data (e.g., plain old telephone service (POTS) data or VoIP data) from the traffic scheduler 114 and communicate the voice data to UE 150 (e.g., a telephone). In another example, the router 112 may receive network data (e.g., IP data) from the traffic scheduler 114 and route the computer communication data to UE 150 (e.g., a computer). In still another example, the router 112 may receive video data (e.g., IPTV data) from the traffic scheduler 114 and route the video data to UE 150 (e.g., a display device or set-top box device). In a particular illustrative example, the router 112 may be included on a removable plug-in module and may provide video processing capability as well as data routing capability to the residential gateway 110.

In some examples, a traffic scheduler 114 distributes data through a wired broadband network interface 116 or a wireless broadband network interface 118 to provide connectivity to a broadband network 120 in communication with an internet network 130. For example, the traffic scheduler 114 selectively distributes data (e.g., to the broadband network 120) in order to satisfy guaranteed minimum QoS requirements in the customer's service agreement or reduce the chance of the customer requesting care and dispatch services. In some examples, the traffic scheduler 114 prioritizes scheduling traffic over the wired broadband interface 116. For example, the wired broadband interface 116 may have much larger bandwidth capacity than the wireless broadband interface 118.

In some examples, traffic scheduler 114 may detect a connectivity event or specified event relating to the wired broadband interface 116 and may schedule data through the wireless broadband interface 118 based on the detected connectivity event or specified event. For example, the traffic scheduler 114 may periodically or aperiodically collect performance information, compute performance distributions or variability metrics, or apply a hierarchy in order to determine whether to direct data to and from the wired broadband interface 116 or the wireless broadband interface 118. In some examples, a connectivity event may be a full or partial loss of connectivity between the broadband network 120 and the residential gateway 110. As another example, a connectivity event may involve the traffic scheduler 114 establishing that the connection between the broadband network 120 and the residential gateway 110 is faulty (e.g., slow, degraded, etc.).

In some examples, an AI Advisor Monitoring Center 140 performs trouble shooting operations to resolve faults or errors, address performance issues or perform preventative maintenance or upgrading to avoid failures. For example, AI advisor monitoring center 140 may proactively and automatically monitor system performance information. In an example, AI Advisor Monitoring Center 140 has the ability to gather information and assess the interplay of the various network elements to provide the residential gateway 110, traffic scheduler 114, user, or customer agent with a view of the performance of the network as it relates to guaranteed minimum QoS requirements in the customer's service agreement. AI Advisor Monitoring Center 140 may also store and access historical problem information to leverage earlier queries and solutions to provide recommendations, probable outcomes and the impact of particular solutions on the network.

In some examples, AI Advisor Monitoring Center 140 may selectively maintain and update a knowledge base with information obtained from network data sources, e.g., topology, events, alarms, power output, network, key performance indicators (KPIs), system or component measurements and outputs, service elements, their interdependence and relationships, and other information generated by the internet network 130 or broadband network 120 to which AI Advisor Monitoring Center 140 is connected. From the cumulative information, AI Advisor Monitoring Center 140 may initially populate the knowledge base and store a representation of the network as a system state representation for a given time period. For example, one or more stored representations may be updated as AI Advisor Monitoring Center 140 receives queries. A system state representation may be any suitable representation of the network and may be stored in machine language form, but may be output to the user in a written or graphical representation or provided in other form including but not limited to video or audio output.

In some examples, AI Advisor Monitoring Center 140 may receive contextual information from the knowledge base and identify problem information in the context of a query. Moreover, in some examples, AI Advisor Monitoring Center 140 may include a natural language query translator (NLQT) in communication with an interface to facilitate operation by a user or customer service agent. For example, the NLQT may be configured to receive voice or written or other queries in natural language form.

In some examples, the AI Advisor Monitoring Center 140 provides a recommendation to the user via an interface. The recommendation may include a recommendation list that contains identification of contextual information or problem information obtained from a knowledge base or a problem monitor, results of contextual evaluation, problem identification and other evaluations described more completely below.

FIG. 2A is a flowchart illustrating an exemplary method of providing stable broadband connectivity of a residential gateway to a service provider network in accordance with the present disclosure. In some examples, the method 200 is performed by a device or machine (e.g., device 400 or computer system 500). Moreover, the method 200 may be performed at a network device, UE, desktop, laptop, mobile device, server device, or by multiple devices in communication with one another. In some examples, the method 200 is performed by processing logic, including hardware, firmware, software, or a combination thereof. In some examples, the method 200 is performed by a processor executing code stored in a computer-readable medium (e.g., a memory).

At block 202, the method 200 manages, by a traffic schedule manager, access to a wireline broadband connection of a residential gateway. For example, the traffic scheduler may manage access to a wireline broadband connection such as a digital subscriber line (DSL), cable, fiber optic, etc. broadband connection and the residential gateway may physically reside within a consumer's residence or place of business.

At block 204, the method 200 manages, by the traffic schedule manager, access to a wireless broadband connection of the residential gateway. For example, the traffic scheduler may manage access to a NR or 5G broadband connection, a 4G-LTE broadband connection, a 3G broadband connection, etc.

At block 205, the method obtains, by the traffic schedule manager, a performance of the broadband connectivity. For example, the performance of the broadband connectivity may be a measurement of the overall performance of the broadband connectivity, e.g., bit rate, packet loss, throughput, transmission delay, availability, jitter, etc. In some examples, a user device (e.g., computer, laptop, mobile device, etc.) may obtain the performance of the broadband connectivity and transmit the performance to the traffic schedule manager.

At block 206, the method 200 determines, by the traffic schedule manager based on the performance, a priority between the wireline broadband connection and the wireless broadband connection. For example, the traffic schedule manager may include a preference for the wireline broadband connection unless there is a loss or degradation of the wireline broadband connectivity (e.g., outage, intermittent data loss, lagging, etc.). Moreover, the traffic schedule manager may determine the priority based on whether the performance satisfies guaranteed minimum QoS requirements in a customer's service agreement. For example, the wireline broadband connection may experience an outage and the traffic schedule manager may utilize the wireless broadband connection to satisfy the customer's minimum QoS bit-rate or throughput requirements.

At block 208, the method 200 provides the broadband connectivity based on the determined priority. In some examples, the traffic manager may direct a user device (e.g., computer, laptop, mobile device, etc.) to utilize a particular broadband connection based on the determined priority.

Figure 2B:
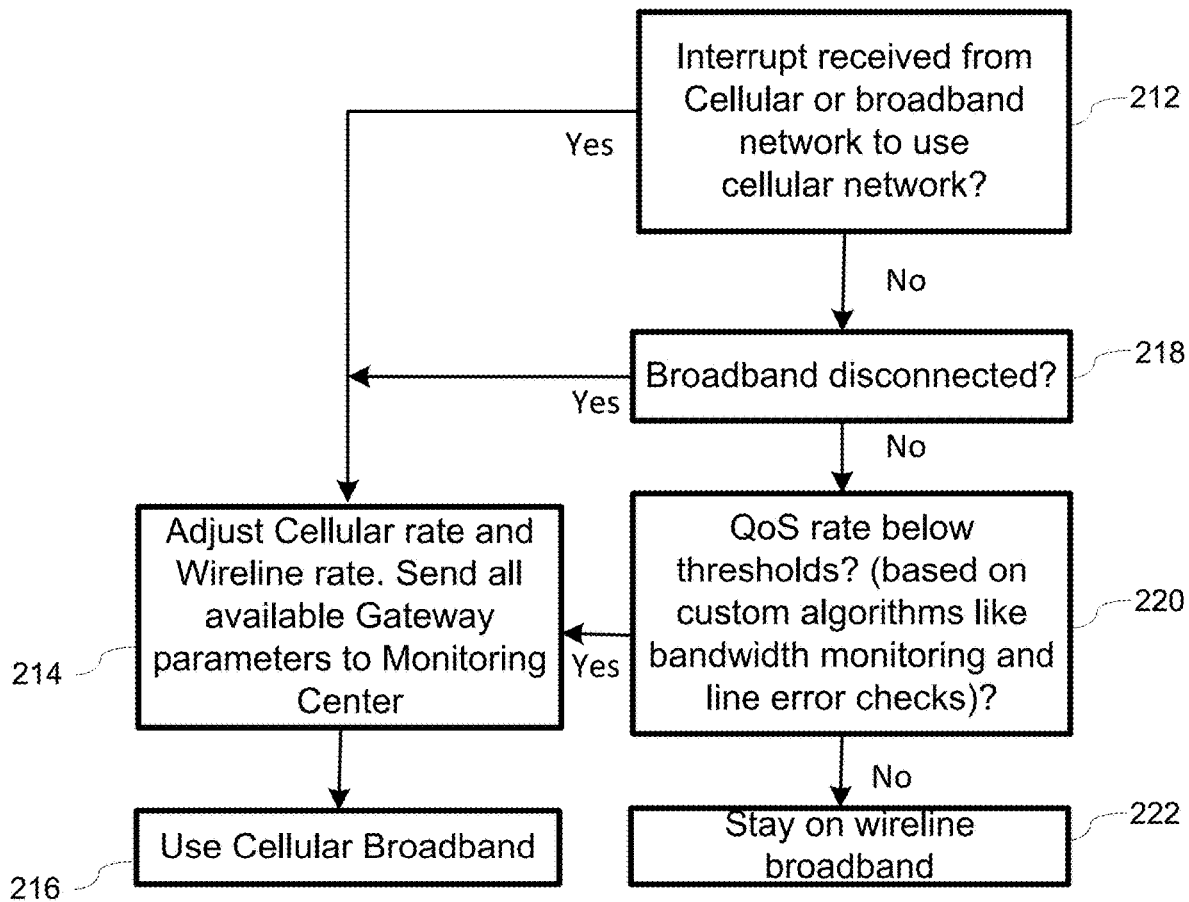
FIG. 2B illustrates a flowchart of an example method of the present disclosure for determining a priority between a wireline and wireless broadband connections of a residential gateway.

FIG. 2B is a flowchart illustrating an exemplary method 210 of determining, by the traffic schedule manager of a residential gateway, a priority between the wireline broadband connection and the wireless broadband connection (e.g., block 206 of method 200). In some examples, the method 210 is performed by a device or machine (e.g., device 400 or computer system 500). Moreover, the method 210 may be performed at a network device, UE, desktop, laptop, mobile device, server device, or by multiple devices in communication with one another. In some examples, the method 210 is performed by processing logic, including hardware, firmware, software, or a combination thereof. In some examples, the method 210 is performed by a processor executing code stored in a computer-readable medium (e.g., a memory).

At block 212, the method 210 checks whether an interrupt is received from either a cellular or broadband network which is an indication to use a cellular network for a broadband connection. If an interrupt to use the cellular network has been received, as illustrated in block 214 of method 210, the method adjusts the cellular rate and wireline rate accordingly. Moreover, the method 210 may send all available gateway parameters (e.g., cellular rate, wireline rate, etc.) to a monitoring center. At block 216, the method 210 may then use the cellular broadband connection of the residential gateway.

If, in block 212, method 210 determines that no interrupt has been received from the cellular or the broadband network to use the cellular network, then the method 210 may check, at block 218 of method 210, whether the broadband network connection is disconnected or if there is another fault in the wireline broadband connection has been detected. If the wireline broadband connection is disconnected or another fault is detected, as illustrated in block 214 of method 210, the method may adjust the cellular rate and wireline rate accordingly. Moreover, the method 210 may send all available gateway parameters (e.g., cellular rate, wireline rate, etc.) to a monitoring center. At block 216, the method 210 may then use the cellular broadband connection of the residential gateway.

If, in block 218, method 210 determines that the wireline broadband connection has not become disconnected or other faults were not detected, then the method 210 may check, at block 220 of method 210, whether the QoS rate is below a threshold. For example, block 220 may employ custom algorithms such as bandwidth monitoring or line error checks. If QoS rate is below the requisite threshold, as illustrated in block 214 of method 210, the method may adjust the cellular rate and wireline rate accordingly. Moreover, the method 210 may send all available gateway parameters (e.g., cellular rate, wireline rate, etc.) to a monitoring center. At block 216, the method 210 may then use the cellular broadband connection of the residential gateway.

If, in block 220, method 210 determines that the QoS rate is not below the requisite threshold, then the traffic manager may, in block 222, continue to utilize the wireline broadband connection.

Figure 2C:
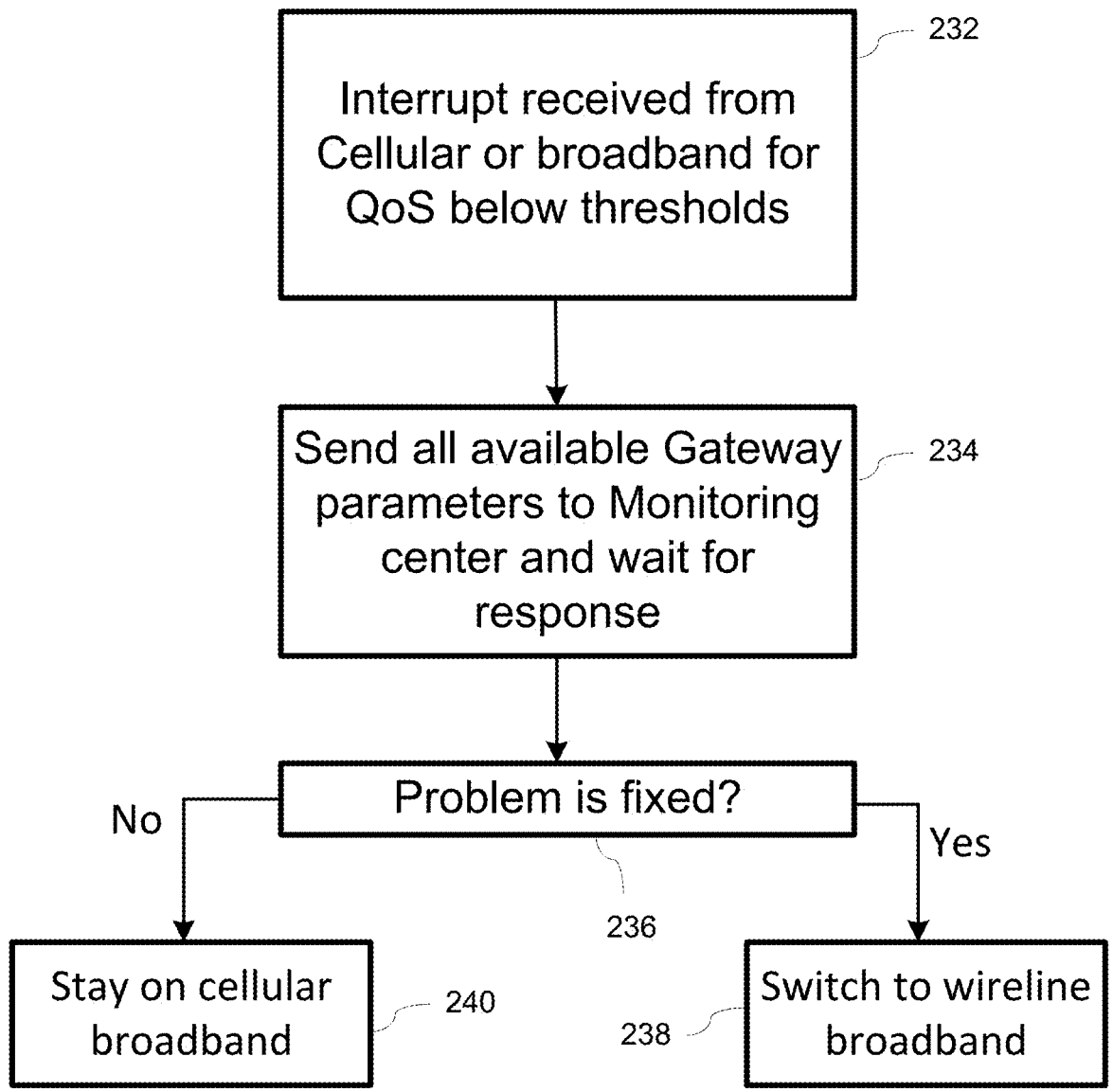
FIG. 2C illustrates a flowchart of an example method of the present disclosure for determining whether to switch from a wireless broadband connection of a wireless gateway to a wireline broadband connection.

FIG. 2C is a flowchart illustrating an exemplary method 230 of determining, by the traffic schedule manager of a residential gateway, whether to switch to a wireline broadband connection from a wireless broadband connection (e.g., block 206 of method 200). In some examples, the method 230 is performed by a device or machine (e.g., device 400 or computer system 500). Moreover, the method 230 may be performed at a network device, UE, desktop, laptop, mobile device, server device, or by multiple devices in communication with one another. In some examples, the method 230 is performed by processing logic, including hardware, firmware, software, or a combination thereof. In some examples, the method 230 is performed by a processor executing code stored in a computer-readable medium (e.g., a memory).

At block 232, the method 230 checks whether an interrupt is received (e.g., from either the cellular or broadband network as an indication to use the cellular or wireline broadband network) or if QoS is below a requisite threshold. At block 234, method 230 sends all available gateway parameters (e.g., cellular rate, wireline rate, etc.) to a monitoring center and waits for a response. At block 236, the method 230 checks to see if the problem is fixed which may, for example, be based on the response from the Monitoring center. If, in block 236, method 230 determines that the problem is fixed, the method switches to the wireline broadband network in block 238. If, in block 236, method 230 determines that the problem is not fixed, the method continues to utilize the wireless broadband network in block 240.

Examples of the methods disclosed herein may be performed in the operation of such computing devices. The order of the blocks presented in the examples above can be varied. For example, blocks can be re-ordered, combined, or broken into sub-blocks. Certain blocks or processes can be performed in parallel.

Figure 3:
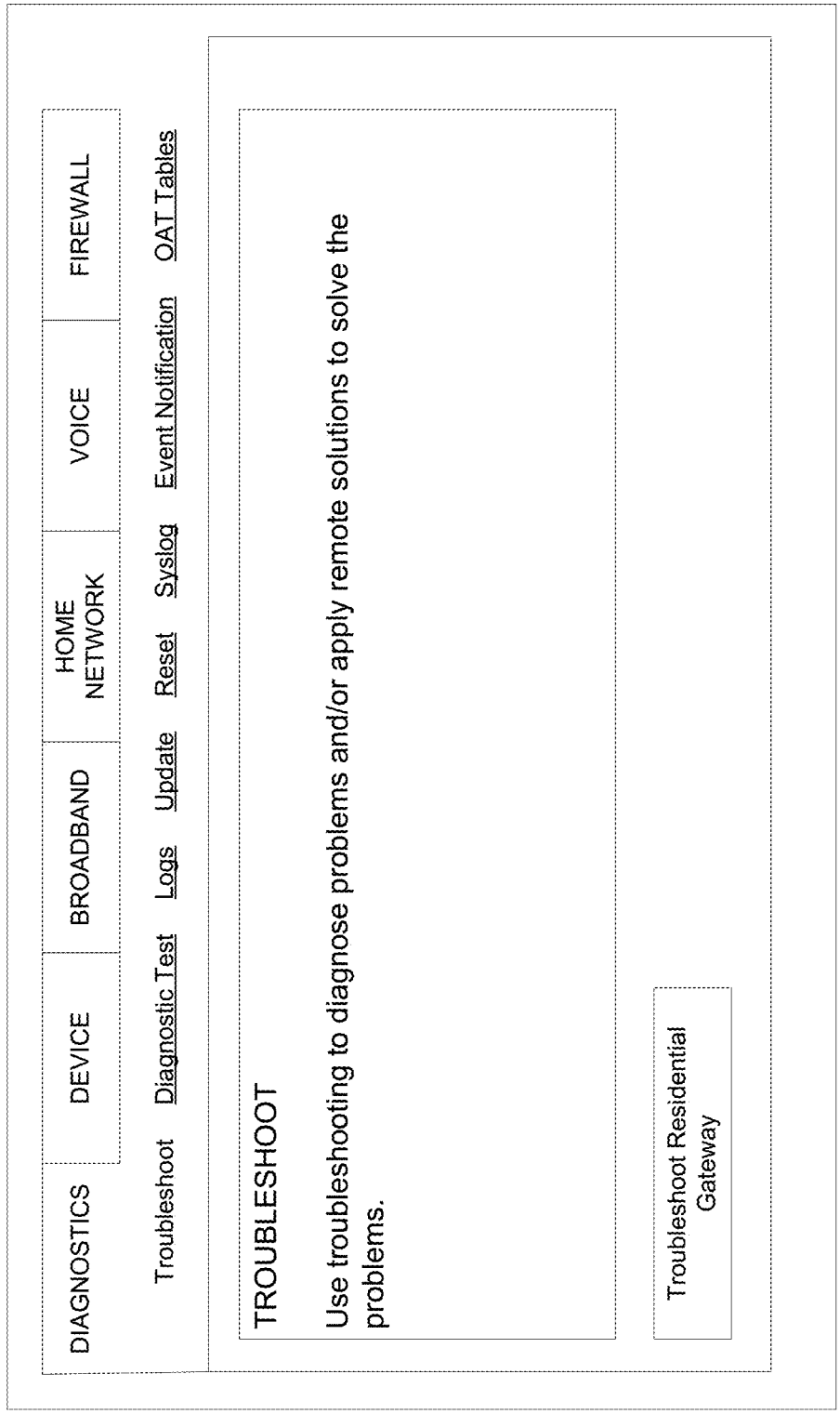
FIG. 3 illustrates an example graphical user interface that may be displayed in connection with a residential gateway at an AI advisor monitoring center.

In some examples, the residential gateway notifies an AI advisor monitoring center 140 about a broadband line problem if the mobile broadband network is used frequently. For example, the AI advisor may diagnose the problem or apply remote solutions to solve the problem. As shown in FIG. 3, an example graphical user interface 300 may be displayed in connection with a residential gateway at an AI advisor monitoring center.

Figure 4:
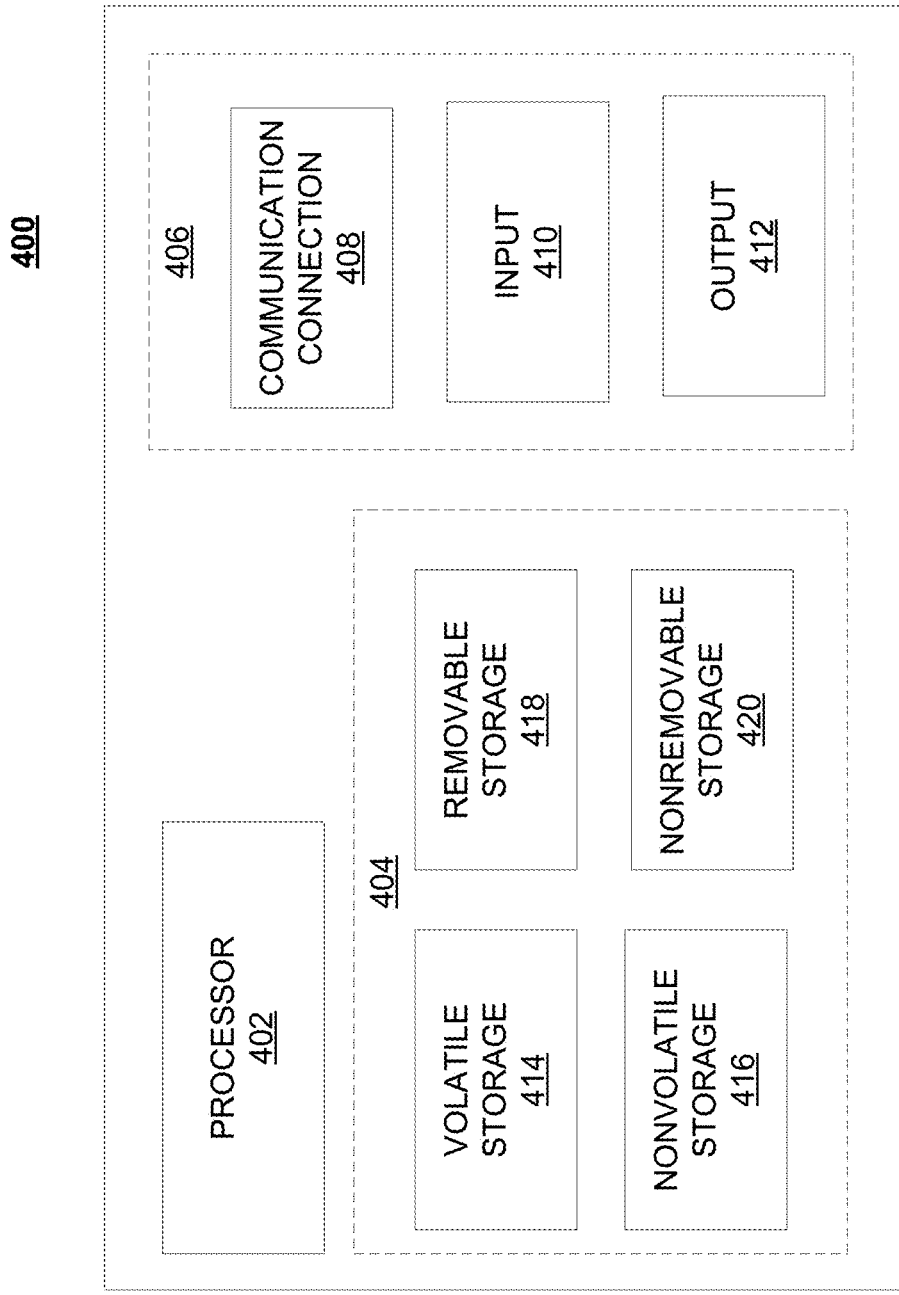
FIG. 4 illustrates a schematic of an exemplary network device.

FIG. 4 is a block diagram of network device 400 that may be connected to or comprise a component of communication system 100. Network device 400 may comprise hardware or a combination of hardware and software. The functionality to facilitate telecommunications via a telecommunications network may reside in one or a combination of network devices 400. Network device 400 depicted in FIG. 4 may represent or perform functionality of an appropriate network device 400, or a combination of network devices 400, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW), a packet data network (PDN) gateway, a Radio Access Network (RAN), a serving mobile location center (SMLC), or the like, or any appropriate combination thereof. It is emphasized that the block diagram depicted in FIG. 4 is exemplary and not intended to imply a limitation to a specific example or configuration. Thus, network device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, network device 400 is not to be construed as software per se.

In addition to processor 402 and memory 404, network device 400 may include an input/output system 406. Processor 402, memory 404, and input/output system 406 may be coupled together (coupling not shown in FIG. 4) to allow communications between them. Each portion of network device 400 may comprise circuitry for performing functions associated with each respective portion. Thus, each portion may comprise hardware, or a combination of hardware and software. Accordingly, each portion of network device 400 is not to be construed as software per se. Input/output system 406 may be capable of receiving or providing information from or to a communications device or other network entities configured for telecommunications. For example, input/output system 406 may include a wireless communications (e.g., 3G/4G/5G/GPS) card. Input/output system 406 may be capable of receiving or sending video information, audio information, control information, image information, data, or any combination thereof. Input/output system 406 may be capable of transferring information with network device 400. In various configurations, input/output system 406 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network device 400 also may contain a communication connection 408 that allows network device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network device 400, determining a type of broadcast message and acting according to the broadcast message type or content, as described herein.

Memory 404 of network device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a non-removable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 400. Memory 404 may comprise executable instructions that, when executed by processor 402, cause processor 402 to effectuate operations to map signal strengths in an area of interest.

Figure 5:
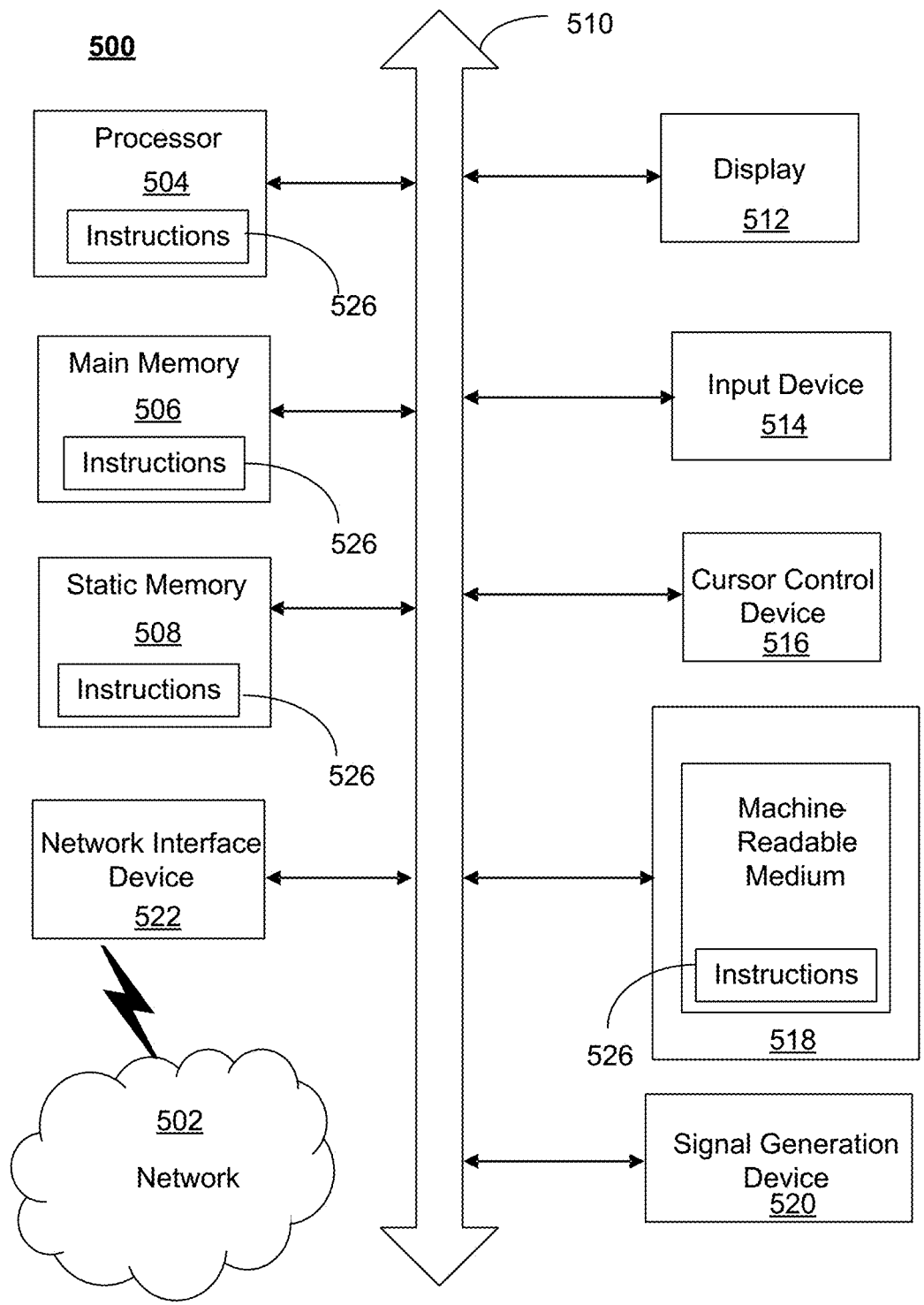
FIG. 5 illustrates a schematic of an exemplary machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 402, network devices 110/120/130, residential gateway 110, UE 150, and other devices of FIG. 1, FIG. 2A, FIG. 2B, FIG. 2C, and FIG. 3. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer, a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., instructions 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
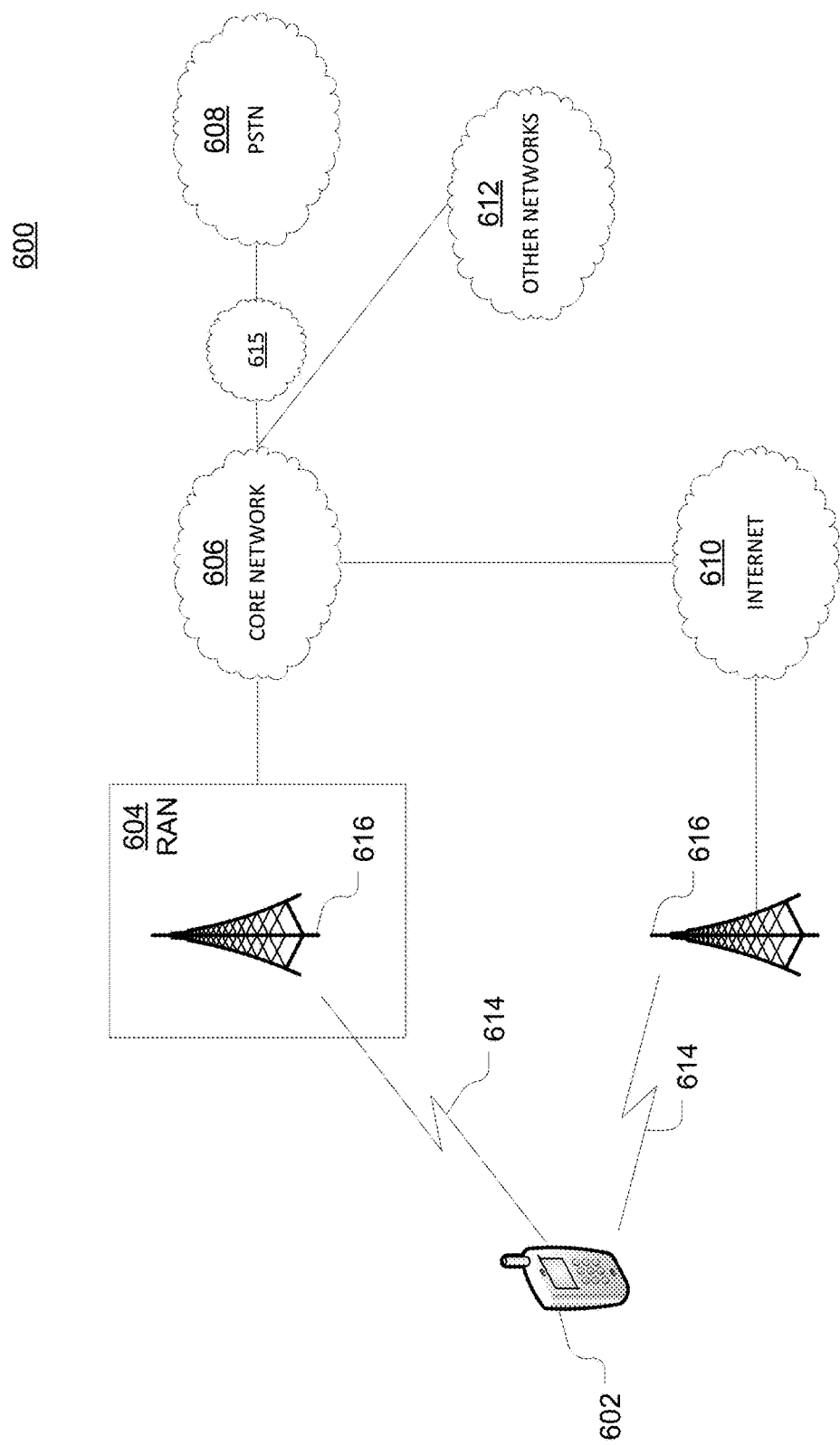
FIG. 6 illustrates an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, Base Stations (BSs), networks, or network elements. Each WTRU 602 may be any type of device configured to operate or communicate in a wireless environment. For example, a WTRU may comprise UE 150, network devices 110/120/130, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PSTN 608, Internet 610, or other networks 612. By way of example, base stations 616 may be a Base Transceiver Station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a Base Station Controller (BSC), a Radio Network Controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input and multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as HSPA or HSPA+. HSPA may include High-Speed Downlink Packet Access (HSDPA) or High-Speed Uplink Packet Access (HSUPA).

As another example, base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally, base station 616 and WTRUs 602 connected to RAN 604 may implement radio technologies such as IEEE 602.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, or VoIP services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide POTS. For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

In this regard, while the subject matter has been described herein in connection with various examples and corresponding FIGs, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

The various aspects described herein can relate to NR, which can be deployed as a standalone radio access technology or as a non-standalone radio access technology assisted by another RAT, such as LTE, for example. It should be noted that although various aspects and examples have been described herein in the context of 5G, UMTS, or LTE, or other next generation networks, the disclosed aspects are not limited to 5G, a UMTS example, or an LTE example as the techniques can also be applied in 3G, 4G, or LTE systems. For example, aspects or features of the disclosed examples can be exploited in substantially any wireless communication technology. Such wireless communication technologies can include UMTS, CDMA, Wi-Fi, WiMAX, GPRS, Enhanced GPRS, 3GPP, LTE, 3GPP2, UMB, HSPA, HSPA+, HSDPA, HSUPA, Zigbee, or another IEEE 802.XX technology. Additionally, substantially all aspects disclosed herein can be exploited in legacy telecommunication technologies.

As used herein, "5G" can also be referred to as NR access. Accordingly, systems, methods, or machine-readable storage media for facilitating link adaptation of downlink control channel for 5G systems are desired. As used herein, one or more aspects of a 5G network can comprise, but is not limited to, data rates of several tens of megabits per second supported for tens of thousands of users; at least one gigabit per second to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; or latency significantly reduced compared to LTE.

An aspect of 5G, which differentiates from previous 4G systems, is the use of NR. NR architecture can be designed to support multiple deployment cases for independent configuration of resources used for random-access channel (RACH) procedures. Since the NR can provide additional services than those provided by LTE, efficiencies can be generated by leveraging the pros and cons of LTE and NR to facilitate the interplay between LTE and NR.

In some examples, the non-limiting term radio network node or simply network node is used. It can refer to any type of network node that serves one or more UEs or that is coupled to other network nodes or network elements or any radio node from where the one or more UEs receive a signal. Examples of radio network nodes are Node B, Base Station (BS), Multi-Standard Radio (MSR) node such as MSR BS, NR, eNode B, gNode B, 5G NodeB, network controller, RNC, BSC, relay, donor node controlling relay, BTS, AP, transmission points, transmission nodes, remote radio unit, remote radio head, nodes in Distributed Antenna System, etc.

Cloud RAN can enable the example of concepts such as Software-Defined Network (SDN) and Network Function Virtualization (NFV) in 5G networks. This disclosure can facilitate a generic channel state information framework design for a 5G network. Certain examples of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all IP, cloud based, and software driven telecommunications network. The SDN controller can work with, or take the place of, Policy and Charging Rules Function (PCRF) network elements so that policies such as QoS and traffic management and routing can be synchronized and managed end to end.

To meet the huge demand for data centric applications, 4G standards can be applied to 5G, also called NR access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In a multicarrier system such as orthogonal frequency-division multiplexing (OFDM), each subcarrier can occupy bandwidth (e.g., subcarrier spacing). If the carriers use the same bandwidth spacing, then it can be considered a single numerology. However, if the carriers occupy different bandwidth or spacing, then it can be considered a multiple numerology.

The 5G standards are introduced in 3GPP Release 15 to cater to the needs of 5G networks. The 5G framework will take advantage of the massive throughput and low latency that new radio provides. Exemplary solutions defined by 3GPP for 5G networks include 5G Non-Standalone (NSA) and 5G Standalone (SA). In 5G NSA, the existing LTE radio access and core network (EPC) is used as an anchor for mobility management and coverage to add the 5G carrier. In 5G SA, an all-new 5G Packet Core will be introduced with several new capabilities built inherently into it. The SA architecture comprises of 5G New Radio (5G NR) and 5G Core Network (5GC). Network Slicing, Virtualization, Multi-Gbps support, ultra low latency, and other such aspects will be natively built into the 5G SA Packet Core architecture. The initial deployments of 5G services are based on 5G NSA, also called option-3. The variants of option-3 (e.g., traffic split across 4G and 5G at eNode B), option-3a (e.g., traffic split across 4G and 5G at EPC), and option-3x (e.g., traffic split across 4G and 5G at 5G cell).

Cloud RAN can enable the example of concepts such as SDN and NFV in 5G networks. This disclosure can facilitate example of 5G RAN based on a centralized/virtualized RAN architecture. 5G RANs are expected to be deployed with massive MIMO antenna systems using a large number of antennas. Certain examples of this disclosure can comprise an SDN controller that can control routing of traffic within the network and between the network and traffic destinations. The SDN controller can be merged with the 5G network architecture to enable service deliveries via open APIs and move the network core towards an all IP, cloud based, and software driven telecommunications network.

The SDN controller can work with, or take the place of, PCRF network elements so that policies such as quality of service and traffic management and routing can be synchronized and managed end to end.

It should be noted that the above multiple access technologies have been adopted in various telecommunication standards to provide a common protocol that enables different UEs to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using OFDM with a cyclic prefix (CP) orthogonal frequency division multiplexing (CP-OFDM) on the downlink (DL), using CP-OFDM or SC-FDMA (e.g., also known as discrete Fourier transform spread OFDM (DFT-s-OFDM)) on the uplink (UL), as well as supporting beamforming, and MIMO antenna technology. However, as the demand for mobile broadband access continues to increase, there exists a need for further improvements in LTE and NR technologies. Preferably, these improvements should be applicable to other multiple access technologies and the telecommunication standards that employ these technologies.

In the following description, numerous specific details are set forth to provide a thorough understanding of various examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example," or "an example," means that a particular feature, structure, or characteristic described in connection with the example is included in at least one example. Thus, the appearances of the phrase "in one example," "in one aspect," or "in an example," in various places throughout this specification are not necessarily all referring to the same example. Furthermore, the particular features, structures, or characteristics may be combined in any suitable manner in one or more examples. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As utilized herein, terms "component," "system," "interface," and the like are intended to refer to a computer-related entity, hardware, software (e.g., in execution), or firmware. For example, a component can be a processor, a process running on a processor, an object, an executable, a program, a storage device, or a computer. By way of illustration, an application running on a server and the server can be a component. One or more components can reside within a process, and a component can be localized on one computer or distributed between two or more computers.

Further, these components can execute from various machine-readable media having various data structures stored thereon. The components can communicate via local or remote processes such as in accordance with a signal having one or more data packets (e.g., data from one component interacting with another component in a local system, distributed system, or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. Yet another example, a component can be an apparatus that provides specific functionality through electronic components without mechanical parts; the electronic components can include one or more processors therein to execute software or firmware that confer(s), at least in part, the functionality of the electronic components. In an aspect, a component can emulate an electronic component via a virtual machine, e.g., within a cloud computing system.

In addition, the disclosed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); or a virtual device that emulates a storage device or any of the above computer-readable media.

For simplicity of explanation, the methods (or algorithms) are depicted and described as a series of acts. It is to be understood and appreciated that the various examples are not limited by the acts illustrated or by the order of acts. For example, acts can occur in various orders or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term "article of manufacture," as used herein, is intended to encompass a computer program accessible from any computer-readable device, earner, or media, including a machine-readable storage medium.

What is claimed:

1. A method comprising:
  managing, by a traffic schedule manager, access to a wireline broadband connection of a residential gateway located at a residential address, the wireline broadband connection having associated therewith a wireline broadband connectivity;
  managing, by the traffic schedule manager, access to a wireless broadband connection of the residential gateway;
  obtaining, by the traffic schedule manager, a performance of the wireline broadband connectivity, the performance of the wireline broadband connectivity being a partial loss of the wireline broadband connectivity;

determining, by the traffic schedule manager based on the performance of the wireline broadband connectivity, a priority between the wireline broadband connection and the wireless broadband connection; and providing broadband connectivity via the wireless broadband connection based on the priority, the wireless broadband connection being configured to only transfer data to one or more base stations determined to be in a vicinity of the residential address.

2. The method of claim 1, wherein the priority is based on quality of service parameters.

3. The method of claim 1, wherein the priority is based on a preference for the wireline broadband.

4. The method of claim 1, further comprising identifying a broadband fault, wherein the priority is based on a severity of the broadband fault.

5. The method of claim 4, further comprising notifying an artificial intelligence (AI) advisor about the broadband fault.

6. The method of claim 4, further comprising diagnosing, by an artificial intelligence (AI) advisor, the broadband fault.

7. The method of claim 4, further comprising determining, by an artificial intelligence (AI) advisor, one or more solutions to the broadband fault.

8. The method of claim 1, further comprising:
identifying a recurring broadband fault; and
issuing by an artificial intelligence (AI) advisor in response to identifying the recurring broadband fault, a service ticket to resolve solve the recurring broadband fault.

9. The method of claim 1, wherein the performance of the wireline broadband connectivity is based upon one or more of bit rate, latency, latency variation, packet loss, and bit error rate.

10. A system comprising:
a processor; and
a memory including instructions that, when executed by the processor, cause the system to:
manage access to a wireline broadband connection of a residential gateway located at a residential address, the wireline broadband connection having associated therewith a wireline broadband connectivity;
manage access to a wireless broadband connection of the residential gateway;
obtain a performance of the wireline broadband connectivity, the performance of the wireline broadband connectivity being a partial loss of the wireline broadband connectivity;
determine, based on the performance of the wireline broadband connectivity, a priority between the wireline broadband connection and the wireless broadband connection; and
provide broadband connectivity via the wireless broadband connection based on the priority, the wireless broadband connection being configured to only transfer data to one or more base stations determined to be in a vicinity of the residential address.

11. The system of claim 10, wherein the priority is based on quality of service parameters.

12. The system of claim 10, wherein the priority is based on a preference for the wireline broadband.

13. The system of claim 10, wherein the instructions further cause the system to identify a broadband fault, wherein the priority is based on a severity of the broadband fault.

14. The system of claim 13, wherein the instructions further cause the system to notify an artificial intelligence (AI) advisor about the broadband fault.

15. The system of claim 13, wherein the instructions further cause the system to diagnose, by an artificial intelligence (AI) advisor, the broadband fault.

16. The system of claim 13, wherein the instructions further cause the system to determine, by an artificial intelligence (AI) advisor, one or more solutions to the broadband fault.

17. The system of claim 10, wherein the instructions further cause the system to:
identify a recurring broadband fault; and
issue by an artificial intelligence (AI) advisor in response to identifying the recurring broadband fault, a service ticket to resolve solve the recurring broadband fault.

18. A non-transitory machine-readable medium comprising executable instructions that, when executed by a processing system including a processor, facilitate performance of operations, the operations comprising:
managing access to a wireline broadband connection of a residential gateway located at a residential address, the wireline broadband connection having associated therewith a wireline broadband connectivity;
managing access to a wireless broadband connection of the residential gateway;
obtaining a performance of the wireline broadband connectivity, the performance of the wireline broadband connectivity being a partial loss of the wireline broadband connectivity;
determining, based on the performance of the wireline broadband connectivity, a priority between the wireline broadband connection and the wireless broadband connection; and
providing broadband connectivity via the wireless broadband connection based on the priority, the wireless broadband connection being configured to only transfer data to one or more base stations determined to be in a vicinity of the residential address.

19. The non-transitory machine-readable medium of claim 18, wherein the priority is based on quality of service parameters.

20. The non-transitory machine-readable medium of claim 18, wherein the operations further comprise:
identifying a broadband fault, wherein the priority is based on a severity of the broadband fault;
notifying an artificial intelligence (AI) advisor about the broadband fault;
diagnosing, by the AI advisor, the broadband fault; and
determining, by the AI advisor, one or more solutions to the broadband fault.

* * * * *

UNITED STATES PATENT AND TRADEMARK OFFICE
CERTIFICATE OF CORRECTION

PATENT NO. : 11,552,839 B2  
APPLICATION NO. : 16/910314  
DATED : January 10, 2023  
INVENTOR(S) : Reza Iranmanesh et al.

Page 1 of 1

It is certified that error appears in the above-identified patent and that said Letters Patent is hereby corrected as shown below:

In the Claims

Column 17, Line 28, the word "solve" should be removed.

Signed and Sealed this  
Eighth Day of July, 2025

Coke Morgan Stewart  
*Acting Director of the United States Patent and Trademark Office*